United States Patent
Akre (10) Patent No.: US 9,956,976 B1
(45) Date of Patent: May 1, 2018

(54) MULTI-PURPOSE ALL-TERRAIN CART

(71) Applicant: Jason K. Akre, Zimmerman, MN (US)

(72) Inventor: Jason K. Akre, Zimmerman, MN (US)

( * ) Notice: Subject to any disclaimer, the term of this patent is extended or adjusted under 35 U.S.C. 154(b) by 118 days.

(21) Appl. No.: 15/059,557

(22) Filed: Mar. 3, 2016

Related U.S. Application Data (60) Provisional application No. 62/235,029, filed on Sep. 30, 2015.

(51) Int. Cl.
| | |
|---|---|
| *B62B 3/02* | (2006.01) |
| *B62B 3/00* | (2006.01) |
| *B62B 3/10* | (2006.01) |
| *B62B 5/00* | (2006.01) |
| *B62B 5/06* | (2006.01) |
| *B62D 55/06* | (2006.01) |
| *E01H 5/06* | (2006.01) |

(52) U.S. Cl.
CPC ............. *B62B 3/002* (2013.01); *B62B 3/02* (2013.01); *B62B 3/104* (2013.01); *B62B 5/0033* (2013.01); *B62B 5/0069* (2013.01); *B62B 5/06* (2013.01); *B62D 55/06* (2013.01); *E01H 5/061* (2013.01)

(58) Field of Classification Search
CPC ........... B62B 3/002; B62B 3/02; B62B 3/104; B62B 5/0033; B62B 5/0069; B62B 5/06; B62D 55/06
See application file for complete search history.

(56) References Cited

U.S. PATENT DOCUMENTS

| | | | | |
|---|---|---|---|---|
| 3,724,874 A * | 4/1973 | Simpson | .................. | B60D 1/38 180/14.1 |
| 5,048,206 A * | 9/1991 | Jones | ...................... | B62B 1/147 280/651 |
| 5,778,567 A * | 7/1998 | Jager | ......................... | E01H 5/06 172/272 |
| 5,927,745 A * | 7/1999 | Cunningham | ......... | A47B 31/04 108/118 |
| 6,050,365 A * | 4/2000 | Newlin | ................. | B66F 11/042 182/14 |
| 6,070,679 A * | 6/2000 | Berg | ...................... | B62B 3/1404 180/19.2 |
| 6,431,314 B1 * | 8/2002 | Boulanger | ............. | B62D 7/142 180/65.1 |
| 6,883,641 B2 * | 4/2005 | Julien | ................... | B66F 11/042 182/141 |
| 8,141,666 B2 * | 3/2012 | Ganiere | .................. | B60L 1/003 180/2.2 |
| 8,905,425 B2 * | 12/2014 | Williams, Jr. | ........... | B60D 1/01 280/478.1 |
| 9,108,831 B2 * | 8/2015 | Beji | ........................ | B66F 11/04 |
| 9,132,766 B2 * | 9/2015 | Scarbrough | ............... | B60P 3/34 |

(Continued)

*Primary Examiner* — Jacob D Knutson
*Assistant Examiner* — Marlon A Acre
(74) *Attorney, Agent, or Firm* — Dave Alan Lingbeck (57) ABSTRACT

An all-purpose, all-terrain cart for transporting objects across rugged terrain and tranformable into a bench with a backrest. The all-purpose, all-terrain cart includes a housing assembly including a base housing having a bottom wall, side walls, a front wall, a back wall and an open top, and including cover members removably disposed upon the open top; a support assembly in communication with the base housing and including racks adjustably and removably mounted to the base housing; and a drive assembly including wheels for moving the base housing upon a ground.

20 Claims, 8 Drawing Sheets

(56) References Cited

U.S. PATENT DOCUMENTS

| | | | | |
|---|---|---|---|---|
| 2001/0027276 | A1* | 10/2001 | Labrecque | A61D 3/00 600/551 |
| 2009/0079254 | A1* | 3/2009 | Jacobs | B62D 33/0625 298/18 |
| 2012/0160577 | A1* | 6/2012 | Anasiewicz | B62D 51/04 180/19.1 |
| 2014/0265254 | A1* | 9/2014 | Sekine | B66F 9/07586 280/638 |
| 2016/0001828 | A1* | 1/2016 | Cates | B62B 5/0033 180/9.22 |
| 2016/0031357 | A1* | 2/2016 | Collins | B62B 5/0003 180/65.1 |
| 2016/0039444 | A1* | 2/2016 | Sekine | B62B 5/0079 180/12 |
| 2016/0121943 | A1* | 5/2016 | Lamb | B62D 51/005 180/19.3 |

* cited by examiner

MULTI-PURPOSE ALL-TERRAIN CART

CROSS-REFERENCE TO RELATED APPLICATIONS

The present application claims the benefit of the U.S. non-provisional application Appl. No. 62/235,029, filed on Sep. 30, 2015, the disclosure of which is expressly incorporated by reference herein in its entirety.

BACKGROUND OF THE INVENTION

Field of the Invention

The present invention relates to carts and more particularly pertains to a new multi-purpose all-terrain cart for transporting objects across rugged terrain and tranformable into a bench with a backrest.

Description of the Prior Art

The use of carts is known in the prior art. More specifically, carts heretofore devised and utilized are known to consist basically of familiar, expected and obvious structural configurations, notwithstanding the myriad of designs encompassed by the crowded prior art which have been developed for the fulfillment of countless objectives and requirements.

The prior art includes rack-type carts provided with exhibiting several racks for the accommodation of cut glass sheets. Another prior art includes a powered cart configured to receive a bundle of roof decking sheets, and which cart rides on the each of three spaced adjacent trusses after being crane lifted onto the said roof trusses. Also another prior art includes a folding utility cart for a providing a movable work platform which may be raised and lowered without the use of tools. The cart employs an upper support member that is spaced apart from a lower support member by a pair of cross braces. Further another prior art includes a dual-motor handcart for lifting, steering, and transporting a heavy object with two motor-powered wheels and a handle, a pair of legs connected to the handle, lift pads for supporting the heavy object. Yet, another prior art includes a powered load carrier having a front wheel and rear driving wheels secured to a lower frame which supports a hinged upper frame that engage a detachable load carrying apparatus which is slidable on the upper frame. While these devices fulfill their respective, particular objectives and requirements, the aforementioned patents do not disclose a new multi-purpose all-terrain cart.

SUMMARY OF THE INVENTION

The general purpose of the present invention, which will be described subsequently in greater detail, is to provide a new multi-purpose all-terrain cart which has many of the advantages of the carts mentioned heretofore and many novel features that result in a new multi-purpose all-terrain cart which is not anticipated, rendered obvious, suggested, or even implied by any of the prior art carts, either alone or in any combination thereof. The present invention includes a housing assembly including a base housing having a bottom wall, side walls, a front wall, a back wall and an open top, and including cover members removably disposed upon the open top; a support assembly in communication with the base housing and including racks adjustably and removably mounted to the base housing; and a drive assembly including wheels for moving the base housing upon a ground. None of the prior art includes the combination of the elements of the present invention.

There has thus been outlined, rather broadly, the more important features of the multi-purpose all-terrain cart in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

It is an object of the present invention to provide a new multi-purpose all-terrain cart which has many of the advantages of the carts mentioned heretofore and many novel features that result in a new multi-purpose all-terrain cart which is not anticipated, rendered obvious, suggested, or even implied by any of the prior art carts, either alone or in any combination thereof.

Still another object of the present invention is to provide a new multi-purpose all-terrain cart for transporting objects across rugged terrain and transformable into a bench with a backrest.

Still yet another object of the present invention is to provide a new all-purpose, all-terrain cart that can either be driven mechanically or manually depending upon the needs.

Even still another object of the present invention is to provide a new all-purpose, all-terrain cart that can transport and secure most any object since the support brackets can be adjusted as desired.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DETAILED DESCRIPTION OF THE INVENTION

With reference now to the drawings, and in particular to FIGS. 1 through 8 thereof, a new multi-purpose all-terrain cart embodying the principles and concepts of the present invention will be described.

As best illustrated in FIGS. 1 through 8, the multi-purpose all-terrain cart generally may comprise a housing assembly 11 including a base housing 12 having a bottom wall 13, side walls 17,18, a front wall 19, a back wall 21 and an open top 66, and including cover members 25,26 removably disposed upon the open top 66 and upon the base housing 12, and may also comprise a support assembly 47 in communication with the base housing 12 and including racks 33,39 adjustably, removably and conventionally mounted upon the base housing 12, and may further comprise a drive assembly 48 including wheels 62,63 for moving the base housing 12 upon a ground.

As shown in FIGS. 1 through 5, the housing assembly 11 may also include a clevis 24 conventionally attached and fastened to an exterior of the front wall 19 and extending forwardly thereof. The bottom wall may be bowed and may have a main portion 14 and opposed end portions 15,16 integral to the main portion 14 with the end portions 15,16 angled upwardly relative to the main portion 14 to allow the base housing 12 to be longitudinally tilted for the cart 10 to traverse upon all types of topography. The housing assembly 11 may further include handle members 67,68 conventionally coupled to outer sides of the side wails 17,18 near the front and back walls 19,21 to facilitate lifting the cart 10 as desired. The housing assembly 11 may also include an elongate bracket 23 disposed intermediate of the base housing and conventionally interconnecting the side walls 17,18 of the base housing 12 at the open top 66 of the base housing 12.

As further illustrated in FIGS. 1-5, the support assembly 47 may include elongate support members 27-29 securely and conventionally disposed upon the base housing 12. Each of the elongate support members 27-29 may include a pair of flanges 30,31 spaced apart and forming a channel therebetween with each of the flanges 30,31 having holes disposed therethrough and spaced along a length thereof. One of the elongate support members 27 is conventionally disposed lengthwise upon a top 22 of the back wall 21 of the base housing 12. Another one of the elongate support members 28 is conventionally disposed lengthwise upon the elongate bracket 23. A third one of the elongate support members 29 is conventionally disposed lengthwise upon a top 20 of the front wall 19. The racks 33,39 are adjustably and removably fastened to the elongate support members 27-29. Each of the racks 33,39 may include rails 34,40 spaced apart and having first and second ends 35,36,41,42 and may also include a cross member 45 conventionally attached at the second ends 36,42 of and interconnecting the rails 34,40. Each of the rails 34,40 may also have a first portion 37,43 and a second portion 38,44 and may be longitudinally curved with the first portion 37,43 angled relative to the second portion 38,44 and with holes 69,70 disposed laterally therethrough near the first end 35,41 thereof. The first end 35,41 of each of the rails 34,40 may be interchangeably, removably and pivotably fastened to a respective elongate support member 27-29 with fastening members. The racks may include a first rack 34 and a second rack 40. Each of the rails 34,40 may be adjustably and interchangeably fastened with fastening members and positioned in the channel at one or more of the holes 32 of a respective elongate support member 27-29.

Figure 2:
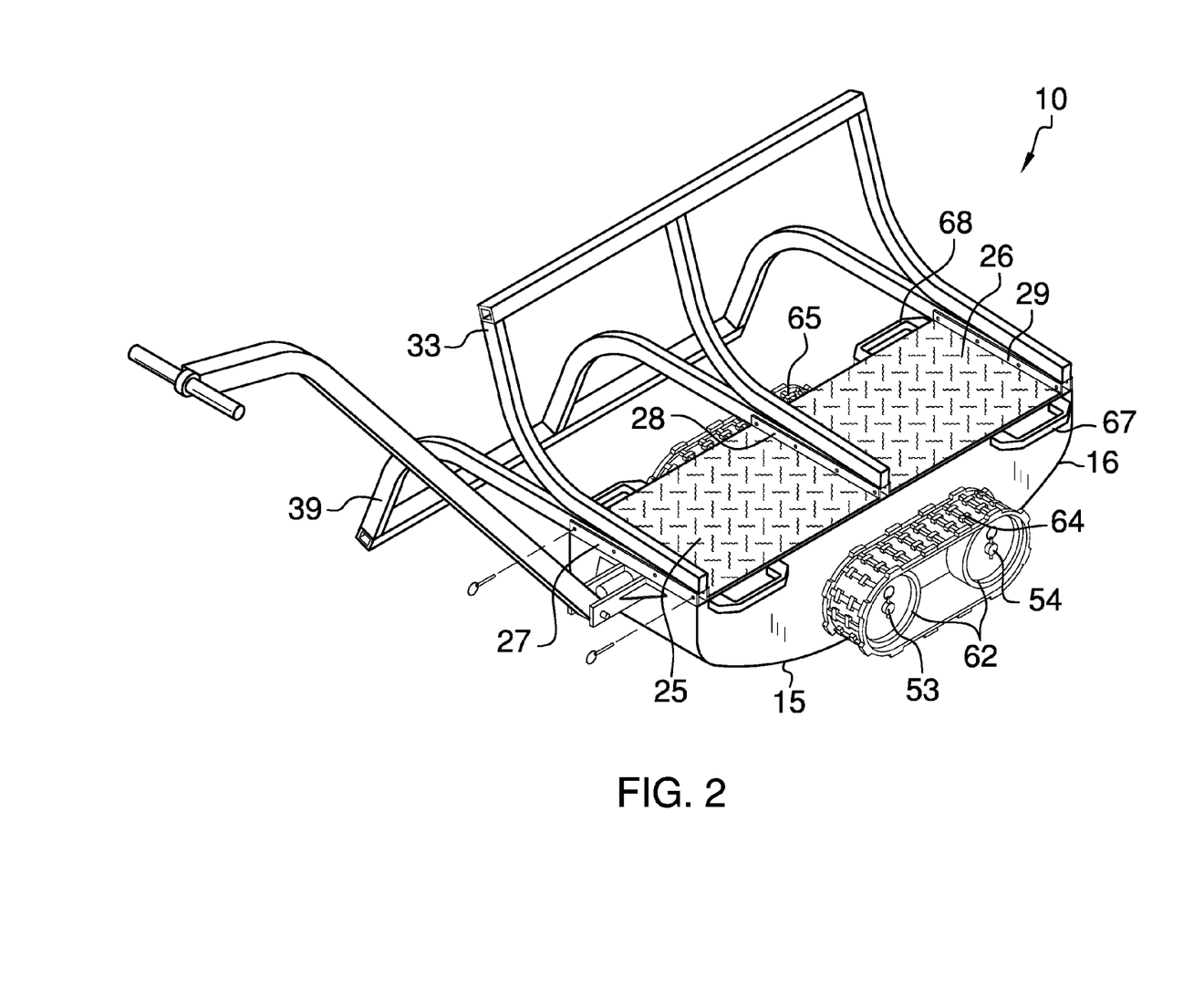
FIG. 2 is a top perspective view of the multi-purpose, all-terrain cart.

As shown in FIG. 2, the first and second racks 34,40 in cooperation with one another and with the base housing 12 is adapted to enclose about selected objects 71 carried upon the cart 10 to prevent the objects 71 from falling off during movement of the cart 10. The first portions 37,43 of the rails 34,40 of the first and second racks 33,39 upon being conventionally fastened to the elongate support members 27-29 are spaced apart and extend upwardly from the base housing 12 and perpendicular to the elongate support members 27-29 with the second portions 38,44 of the rails 34,40 of the first and second racks 33,39 angled away from one another.

Figure 3:
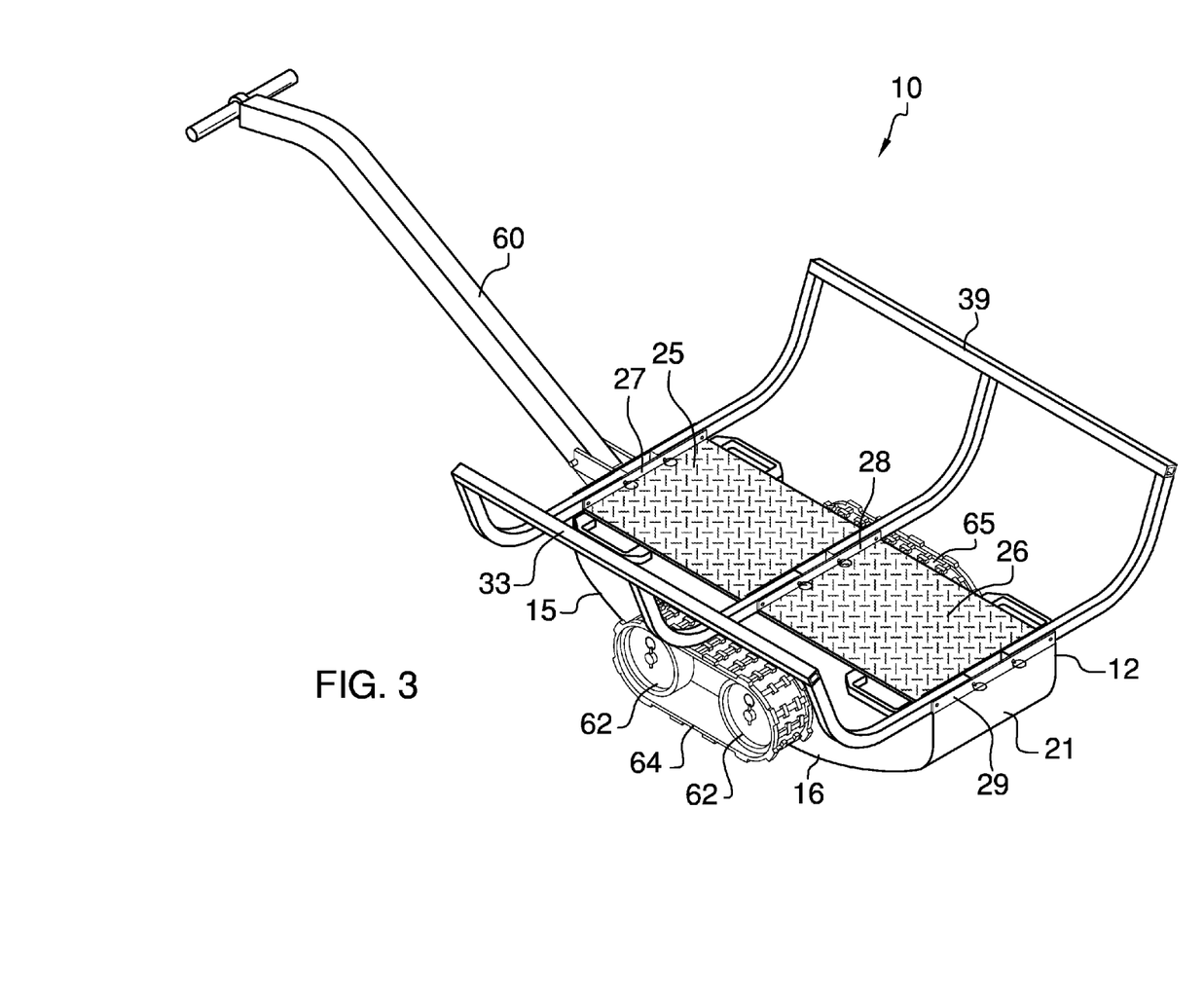
FIG. 3 is a top perspective view of the multi-purpose, all-terrain cart.

As shown in FIG. 3, the first and second racks 33,39 in cooperation with one another and with the base housing 12 is adapted to form a seat with the second portions 38,44 of the rails 34,40 of the first rack 33 angled upwardly from the base housing 12 to form a backrest and with the first portions 37,43 of the rails 34,40 of the second rack 39 disposed parallel with the elongate support members 27-29 and the second portions 38,44 of the racks 34,40 of the second rack 39 angled downwardly adjacent to the base housing 12 and engagable to a ground to stabilize the base housing 12.

Figure 4:
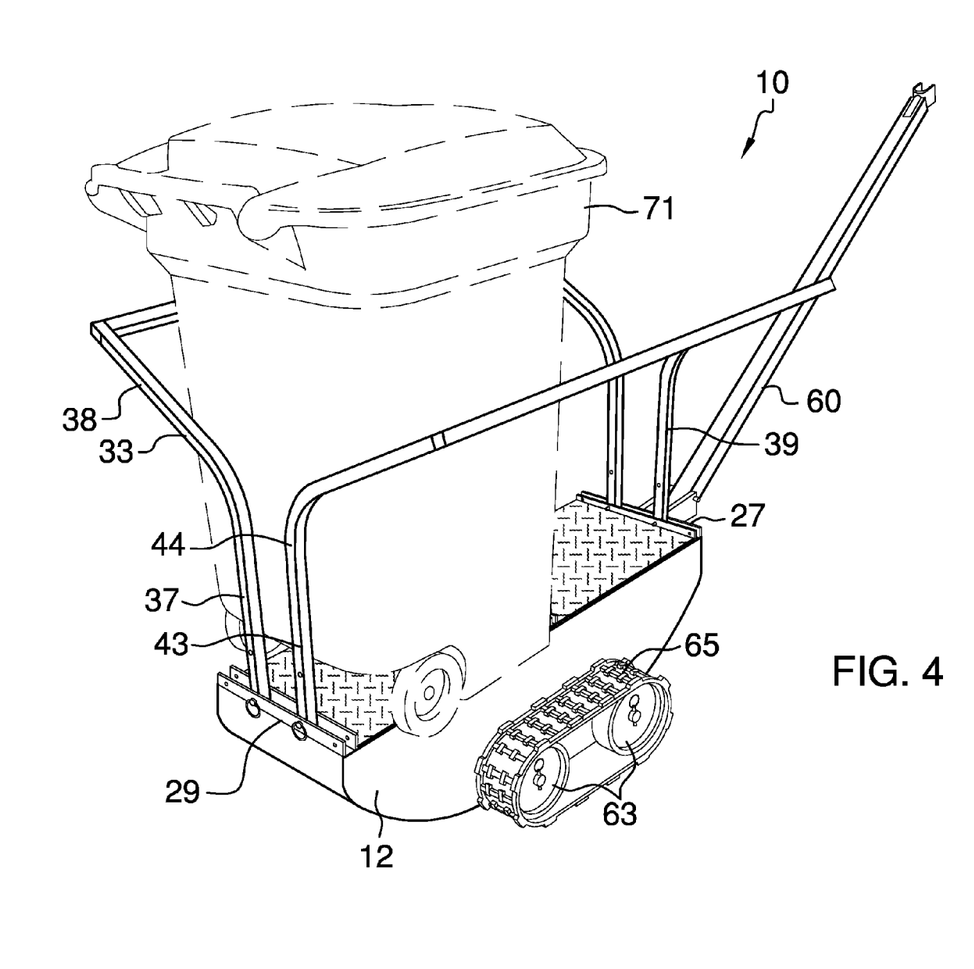
FIG. 4 is a top perspective view of the multi-purpose, all-terrain cart
Figure 5:
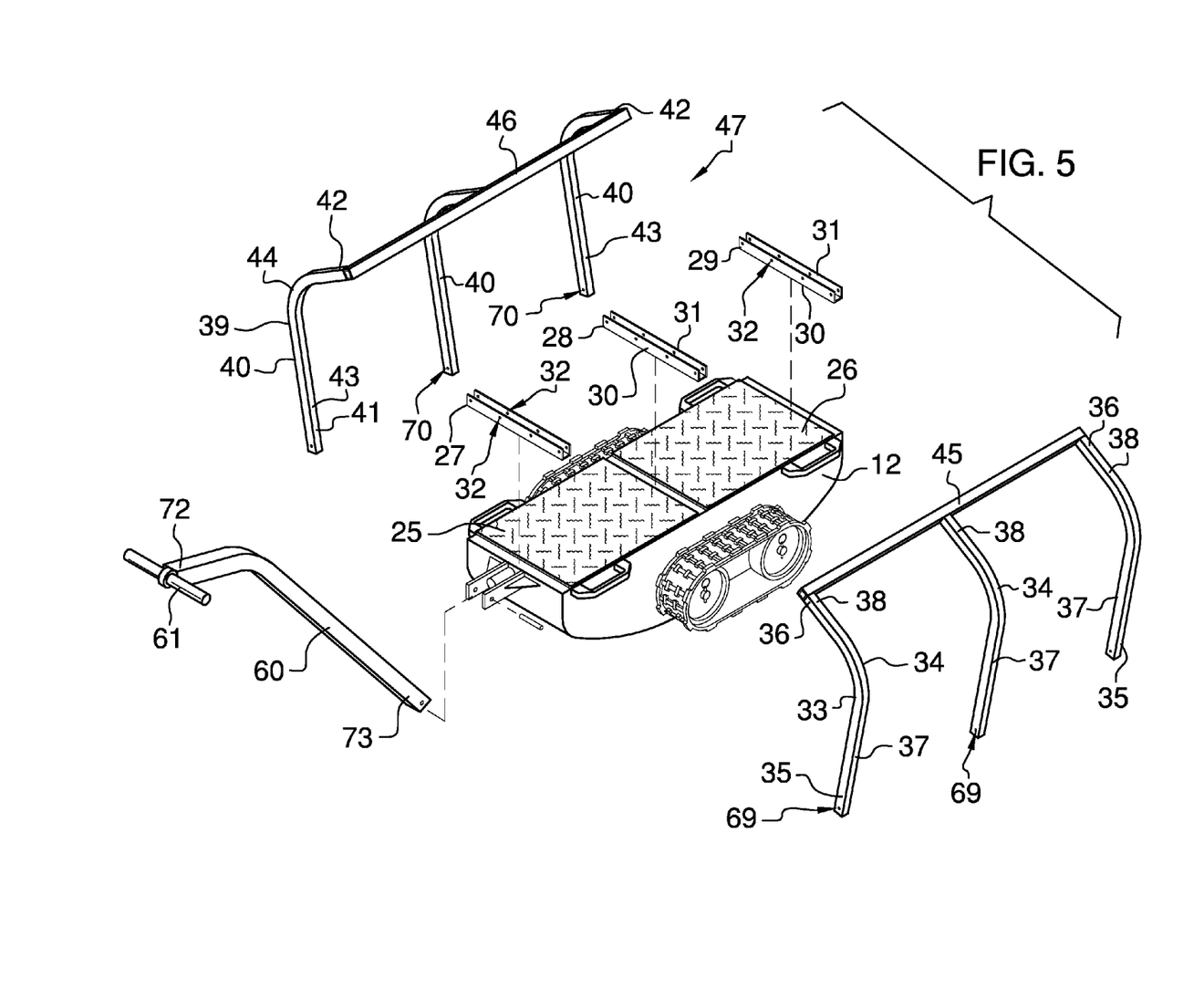
FIG. 5 is an exploded perspective view of the multi-purpose, all-terrain cart.

As shown in FIG. 4, the first and second racks 33, 39 in cooperation with one another and with the base housing 12 is adapted to enclose about selected objects 71 carried upon the base housing 12. The first portions 37,43 of the rails 34,40 of the first and second racks 33,39 upon being conventionally fastened to the elongate support members 27-29 are disposed parallel to the elongate support members 27,29 and the second portions 38,44 of the rails 34,40 of the first and second racks 33,39 are angled away from one another.

Figure 6:
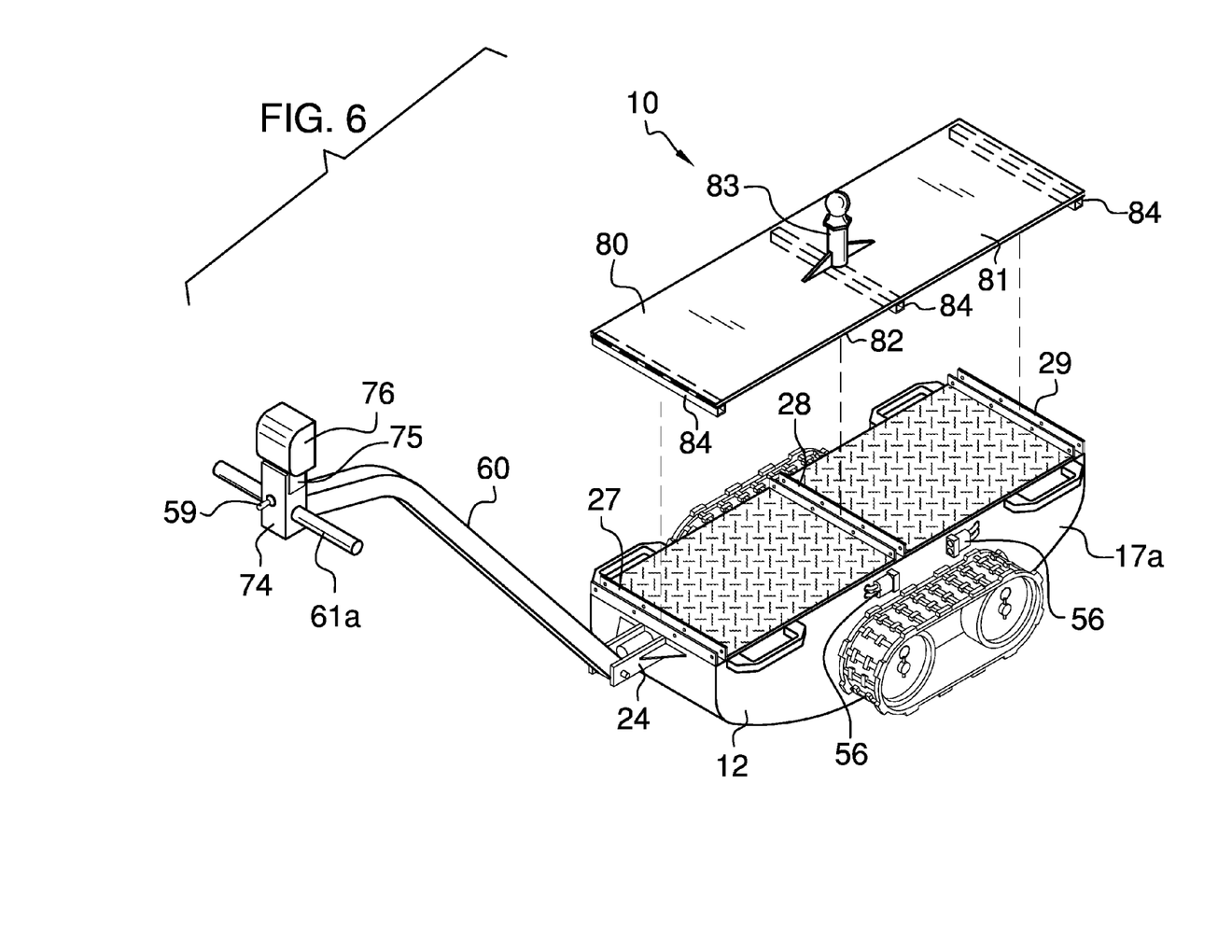
FIG. 6 is another exploded top and side perspective view of the multi-purpose, all-terrain cart.

As shown in FIG. 6, the support assembly may also include a planar support 80 having a top side 81 and a bottom side 82 and may further include a ball mount 83 conventionally disposed and centered upon the top side 81 of the planar support 80 and may also include rail members 84 conventionally disposed upon and spaced apart and traversing the bottom side 82 of the planar support 80 and removably received and conventionally secured in the elongate support members 27-29 for hitching to a conveyance.

Figure 7:
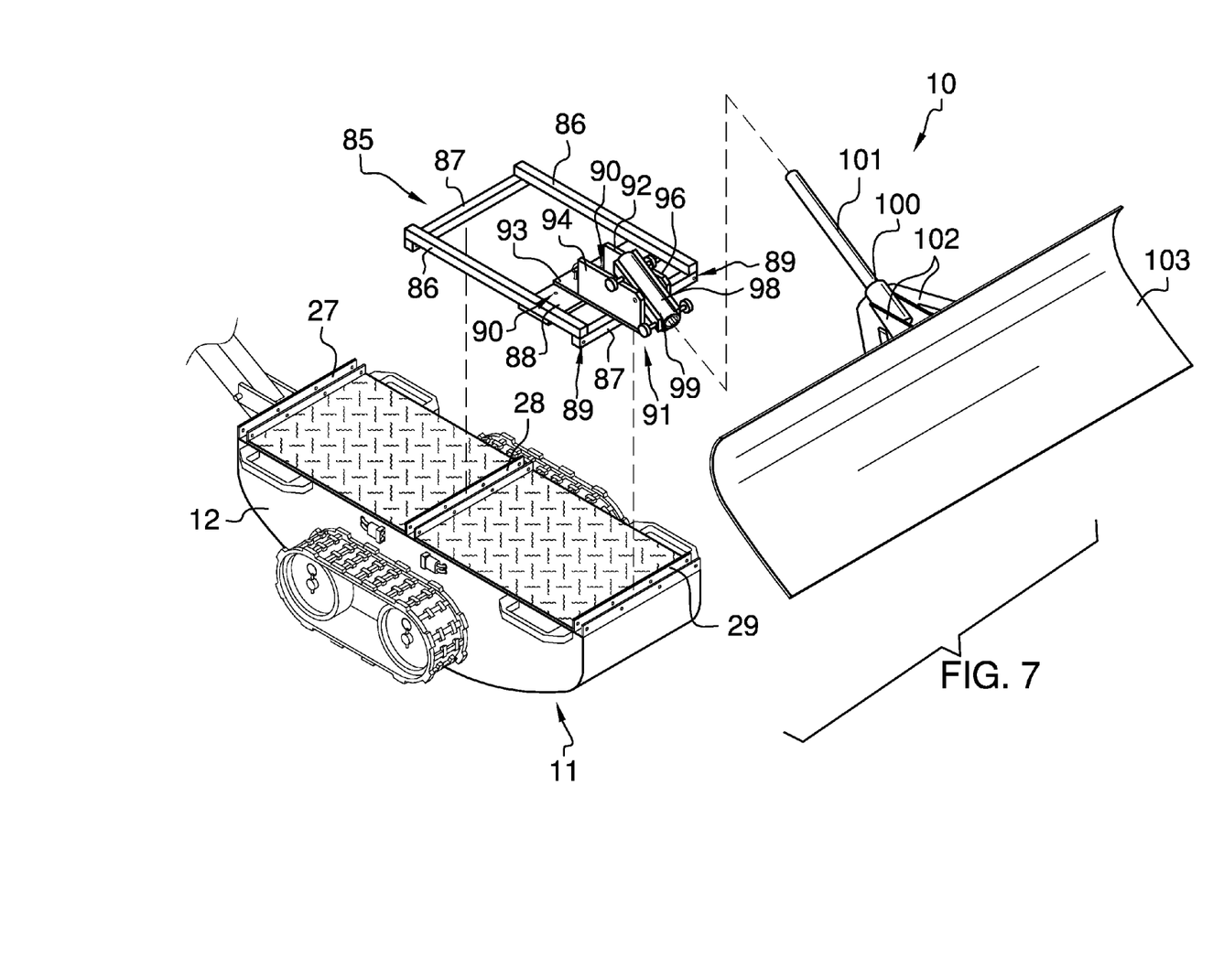
FIG. 7 is another exploded top and side perspective view of the multi-purpose, all-terrain cart.
Figure 8:
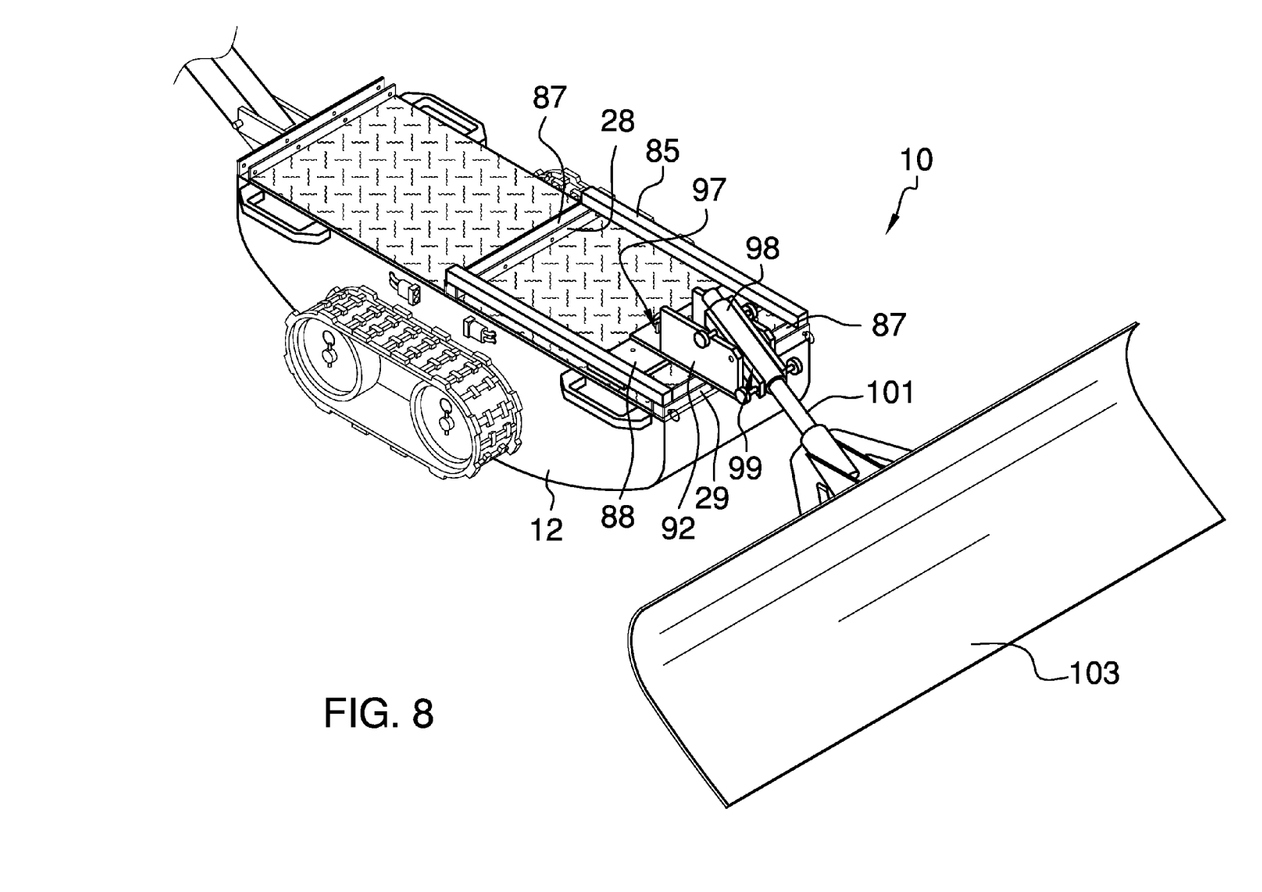
FIG. 8 is another top and side perspective view of the multi-purpose, all-terrain cart.

As shown in FIGS. 7 and 8, the support assembly further may include a bracket assembly 85 removably received and conventionally secured in a plurality of the elongate support members 27-29, and may also include a plow support assembly 91 pivotably and conventionally mounted upon the bracket assembly 85, and may further include a plow member 101 adjustably and conventionally fastened to the plow support assembly 91. The bracket assembly 85 may include elongate braces 86 and cross members 88,89 conventionally interconnecting the elongate braces 86 and spaced apart and removably received and conventionally secured in the plurality of the elongate support members 27-29 and having holes 89 disposed laterally therethrough. The cross members 87,88 may include a planar cross member 88 having holes 90 disposed therethrough. The plow support assembly 91 may include a bracket member 92 having a bottom wall 93 and side walls 94,96 and securely and conventionally mounted upon a plurality of the cross members 87,88 and may also include an elongate holder 98 pivotably and conventionally mounted to and between the side walls 94,96 and having a channel 99 longitudinally disposed therein and therethrough. The bottom wall 93 of the bracket member 92 may have a hole 97 disposed therethrough near an end thereof and in communication with the holes 90 through the planar cross member 88 for securing the bracket member 92 to the planar cross member 88. The plow member 100 may include a support shaft 101 adjustably received and conventionally fastened in the channel 99 of the elongate holder 98, and may also include blade support brackets 102 conventionally coupled to the support shaft 101, and may further include a blade 103 conventionally coupled to the blade support brackets 102 and to the support shaft 101 for moving material upon a ground.

Figure 1:
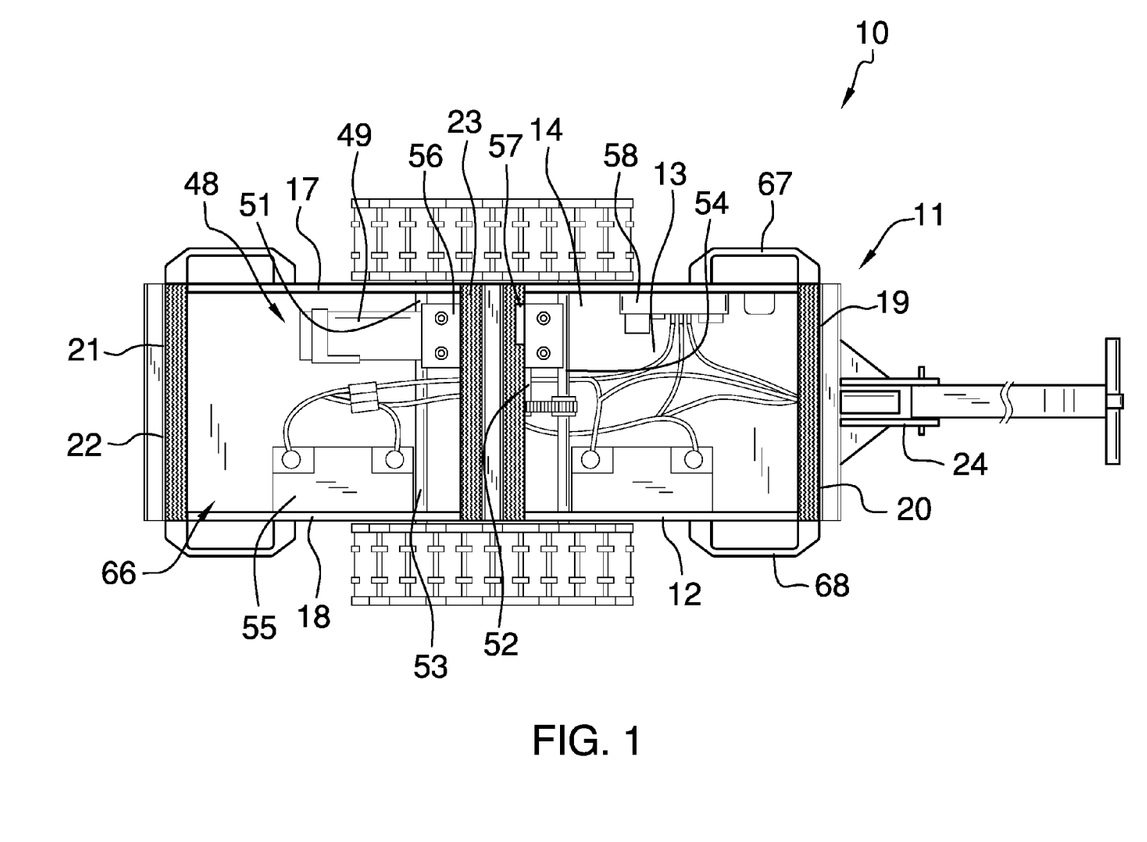
FIG. 1 is a top plan view of the multi-purpose, all-terrain cart.

As shown in FIG. 1, the drive assembly 48 may include a motor 49 conventionally disposed inside the base housing 12, rotatable output shafts 51,52 each in conventional communication with the motor 49, rotatable drive shafts 53,54 each in conventional communication with a respective output shaft 51,52 and extending through a respective side wall 17,18 of the base housing 12, at least one battery 55 to energize the motor 49, and a gear engagement switch 57 in conventional communication with the drive shafts 53,54 and the motor 49 for engaging and disengaging the motor 49 from the drive shafts 53,54 to either power the cart 10 manually or mechanically. The drive assembly 48 may include battery charging ports 56 extending through a side wall 17 of the base housing 12 and conventionally mounted upon an outer side 17a of the side wall 17 and conventionally connected to the at least one battery 55. The drive assembly 48 may also include a variable speed control module 58 conventionally disposed in the base housing 12 and in conventional communication with the motor 49, and may also include a tongue 60 having a front end 72 and a back end 73 pivotably and conventionally coupled to the clevis 24, and may further include a handle 61 conventionally coupled to the front end 72 of the tongue 60 tor steering the cart 10, and may also include a forward and reverse switch 59 in conventional communication with the variable speed control module 58. The handle 61 may include a throttle 61a in conventional communication with the variable speed control module 58 to power the cart 10 at variable speeds. The drive assembly 48 may further include a light support member 74 conventionally attached to the front end 72 of the tongue 60 and to the handle 61, and may also include a light bracket 75 conventionally mounted upon the light support member 74, and may further include a light member 76 conventionally supported upon the light bracket 75 and in conventional communication with the at least one battery 55. The forward and reverse switch 59 may be conventionally mounted to the light support member 74. Each of the wheels 62, 63 may be conventionally mounted to a respective drive shaft 53,54 for rotation therewith. The drive assembly 48 may further include endless track members 64,65 each conventionally disposed about a respective pair of the wheels 62,63 to facilitate moving the cart 10 upon all types of terrain.

In use, the racks 33,39 may be interchangeably and adjustably connected conventionally to the elongate support members 27-29 to enclose about different sizes of objects 71 that can be carried upon and transported by the base housing 12 or the planar support 80 may be connected conventionally to the elongate support members 27-29 for moving conveyances with the cart 10 being powered with the motor 49 or, upon disengaging the drive shafts 53,54 using the gear engagement switch 57, manually by the user pushing or pulling the cart 10 using the handle 61. The racks 33,39 may also be adjusted and positioned to form a seat upon which the user may sit with one of the racks 33,39 serving as a backrest.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the multi-purpose all-terrain cart. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An all purpose, all-terrain cart comprising:
   a housing assembly including a base housing having a bottom wall, side walls, a front wall, a back wall and an open top, and including cover members removably disposed upon the open top, wherein the housing assembly also includes an elongate bracket disposed intermediate of the base housing and interconnecting the side walls of the base housing at the open top of the base housing;
   a support assembly in communication with the base housing and including racks adjustably and removably mounted to the base housing; and
   a drive assembly including wheels for moving the base housing upon a ground.

2. The all-purpose, all-terrain cart as described in claim 1, wherein the support assembly includes elongate support members securely disposed upon the base housing, wherein each of the elongate support members includes a pair of flanges spaced apart and forming a channel therebetween with each of the flanges having holes spaced along a length thereof.

3. The all-purpose, all-terrain cart as described in claim 2, wherein one of the elongate support members is disposed lengthwise upon a top of the back wall of the base housing, another one of the elongate support members is disposed lengthwise upon the elongate bracket, and a third one of the elongate support members is disposed lengthwise upon a top of the front wall.

4. The all-purpose, all-terrain cart as described in claim 2, wherein the support assembly further includes racks adjustably and removably fastened to the elongate support members.

5. The all-purpose, all-terrain cart as described in claim 4, wherein each of the racks includes rails spaced apart and each having first and second ends and also includes a cross member attached at the second ends of and interconnecting the rails.

6. The all-purpose, all-terrain cart as described in claim 5, wherein each of the rails has a first portion and a second portion and is longitudinally curved with the first portion angled relative to the second portion and with holes disposed laterally therethrough near the first end thereof.

7. The all-purpose, all-terrain cart as described in claim 5, wherein the first end of each of the rails are interchangeably, removably and pivotably fastened to a respective said elongate support member, wherein the racks include a first rack and a second rack.

8. The all-purpose, all-terrain cart as described in claim 5, wherein each of the rails is adjustably and interchangeably fastened and positioned in the channel at one or more of the holes of a respective said elongate support member.

9. The all-purpose, all-terrain cart as described in claim 7, wherein the first and second racks in cooperation with one another and with the base housing is adapted to enclose about selected objects carried upon the cart to prevent the objects from falling off during movement of the cart, wherein the first portions of the rails of the first and second racks upon being fastened to the elongate support members are spaced apart and extend upwardly from the base housing and perpendicular to elongate support members with the second portions of the rails of the first and second racks angled away from one another.

10. The all-purpose, all-terrain cart as described in claim 7, wherein the first and second racks in cooperation with one another and with the base housing is adapted to form a seat with the second portions of the rails of the first rack angled upwardly from the base housing to form a backrest and with the first portions of the rails of the second rack disposed parallel with the elongate support members and the second portions of the rails of the second rack angled downwardly adjacent to the base housing and engagable to a ground to stabilize the base housing.

11. The all-purpose, all-terrain cart as described in claim 7, wherein the first and second racks in cooperation with one another and with the base member is adapted to enclose about selected objects carried upon the base housing, wherein the first portions of the rails of the first and second racks upon being fastened to the elongate support members are disposed parallel to the elongate support members and the second portions of the rails of the first and second racks are angled away from one another.

12. The all-purpose, all-terrain cart as described in claim 7, wherein the support assembly also includes a planar support having a top side and a bottom side and further includes a ball mount disposed and centered upon the top side of the planar support and also includes rail members disposed upon and spaced apart and traversing the bottom side of the planar support and removably and securely received in the elongate support members for hitching to a conveyance.

13. The all-purpose, all-terrain cart as described in claim 7, wherein the support assembly further includes a bracket assembly removably and securely received in a plurality of the elongate support members, and also includes a plow support assembly pivotably mounted upon the bracket assembly, and further includes a plow member adjustably fastened to the plow support assembly.

14. The all-purpose, all-terrain cart as described in claim 13, wherein the bracket assembly includes elongate braces and cross members interconnecting the elongate braces and spaced apart and removably and securely received in the plurality of the elongate support members and having holes disposed laterally therethrough, wherein the cross members includes a planar cross member having holes disposed therethrough.

15. The all-purpose, all-terrain cart as described in claim 14, wherein the plow support assembly includes a bracket member having a bottom wall and side walls and securely mounted upon a plurality of the cross members and also includes an elongate holder pivotably mounted to and between the side walls and having a channel disposed therein and therethrough, wherein the bottom wall of the bracket member has a hole disposed therethrough near an end thereof and in communication with the holes through the planar cross member for securing the bracket member to the planar cross member.

16. The all-purpose, all-terrain cart as described in claim 15, wherein the plow member includes a support shaft adjustably received and fastened in the channel of the elongate holder, and also includes blade support brackets coupled to the support shaft, and further includes a blade coupled to the blade support brackets and to the support shaft for moving material upon a ground.

17. An all-purpose, all-terrain cart comprising: a housing assembly including a base housing having a bottom wall, side walls, a front wall, a back wall and an open top, and including cover members removably disposed upon the open top, wherein the housing assembly also includes a clevis attached to an exterior of the front wall and extending forwardly thereof;
   a support assembly in communication with the base housing and including racks adjustably and removably mounted to the base housing; and
   a drive assembly including wheels for moving the base housing upon a ground, wherein the drive assembly includes a motor disposed inside the base housing, rotatable output shafts in communication with the motor, rotatable drive shafts each in communication with a respective said output shaft and extending through a respective said side wall of the base housing, at least one battery to energize the motor, and a gear engagement switch in communication with the drive shafts and the motor for engaging and disengaging the motor from the drive shafts to either power the cart manually or mechanically, wherein the drive assembly further includes battery charging ports in communication with the at least one battery and mounted to an outer side of one of the side walls of the base housing.

18. The all-purpose, all-terrain cart as described in claim 17, wherein the drive assembly also includes a variable speed control module disposed in the base housing and in communication with the motor, and also includes a tongue having a front end and a back end pivotably coupled to the clevis, and further includes a handle coupled to the front end of the tongue for steering the cart, and also includes a forward and reverse switch in communication with the variable speed control module; wherein the handle includes a throttle in communication with the variable speed control module to power the cart at variable speeds.

19. The all-purpose, all-terrain cart as described in claim 18, wherein the drive assembly further includes a light support member attached to the front end of the tongue and to the handle, and also includes a light bracket mounted upon the light support member, and further includes a light member supported upon the light bracket and in communication with the at least one battery, wherein the forward and reverse switch is mounted to the light support member.

20. The all-purpose, all-terrain cart as described in claim 17, wherein each of the wheels is mounted to a respective said drive shaft for rotation therewith, wherein the drive assembly further includes endless track members each disposed about a respective pair of the wheels to facilitate moving of the cart upon all types of terrain.

\* \* \* \* \*